Jan. 18, 1966     D. L. RINGKAMP ETAL     3,229,685
BLOOD PRESSURE MEASURING
Filed April 19, 1963     5 Sheets-Sheet 1
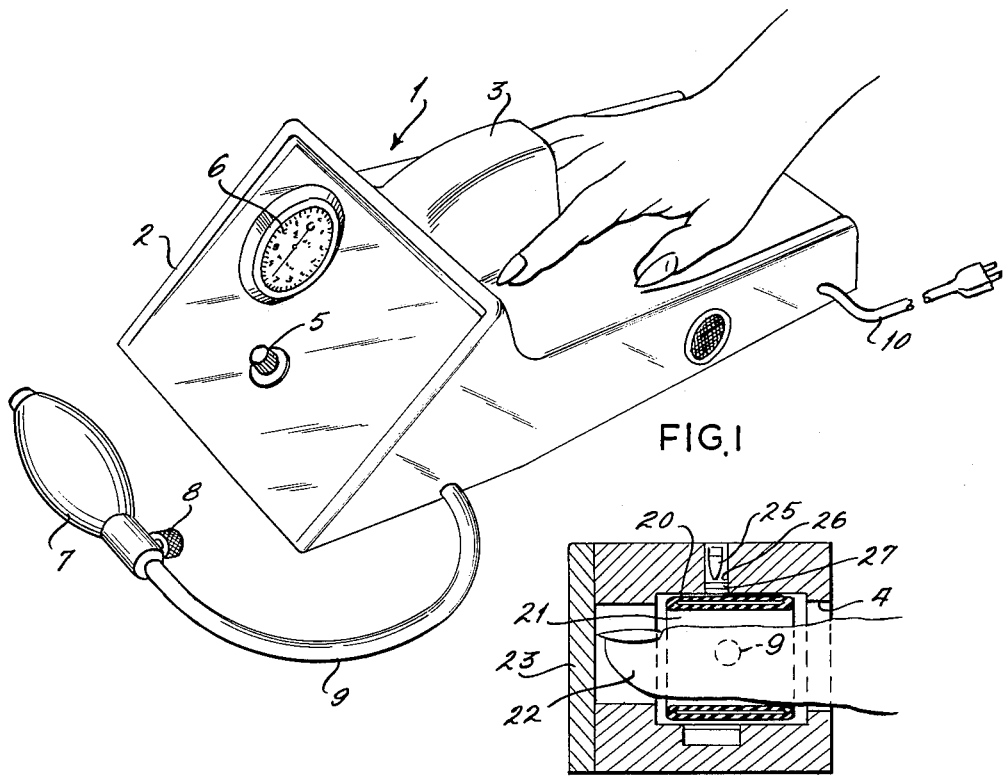
FIG. 1
FIG. 2
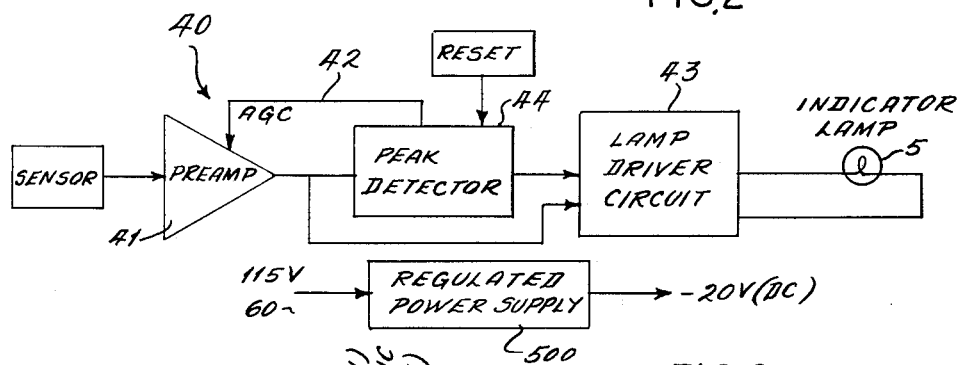
FIG. 3
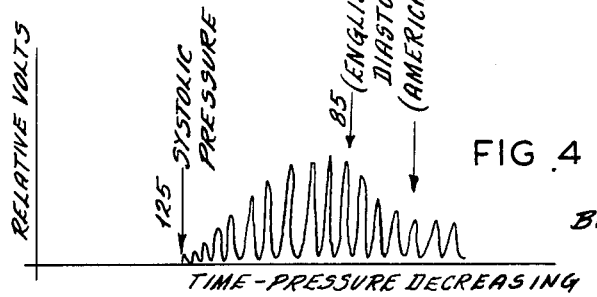
FIG. 4
INVENTORS:
DONALD L. RINGKAMP
JOHN R. THOMPSON
THOMAS H. JACOBI
BY 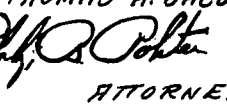
ATTORNEY.

INVENTORS:
DONALD L. RINGKAMP
JOHN R. THOMPSON
THOMAS H. JACOBI
BY
ATTORNEY.

Jan. 18, 1966  D. L. RINGKAMP ETAL  3,229,685
BLOOD PRESSURE MEASURING
Filed April 19, 1963  5 Sheets-Sheet 5
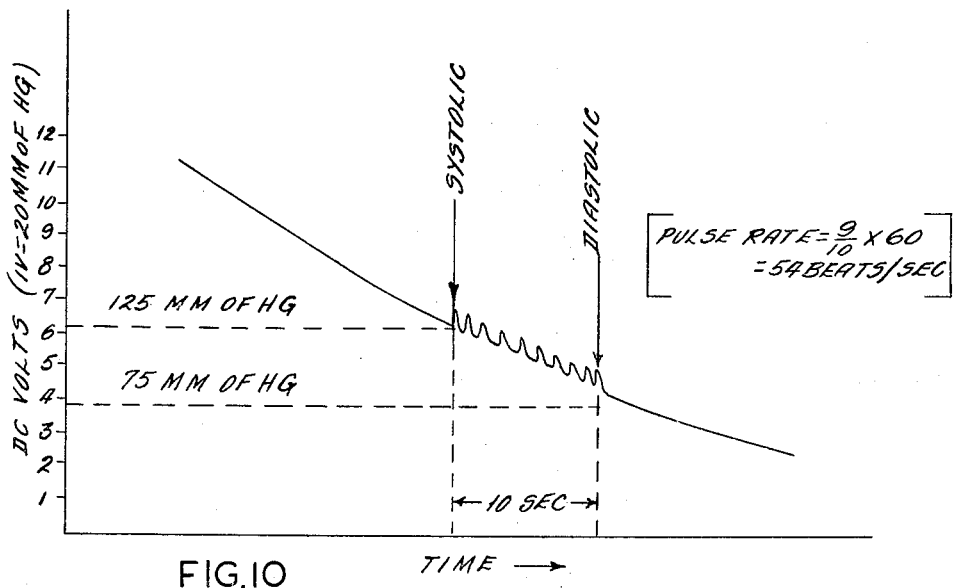
FIG. 10
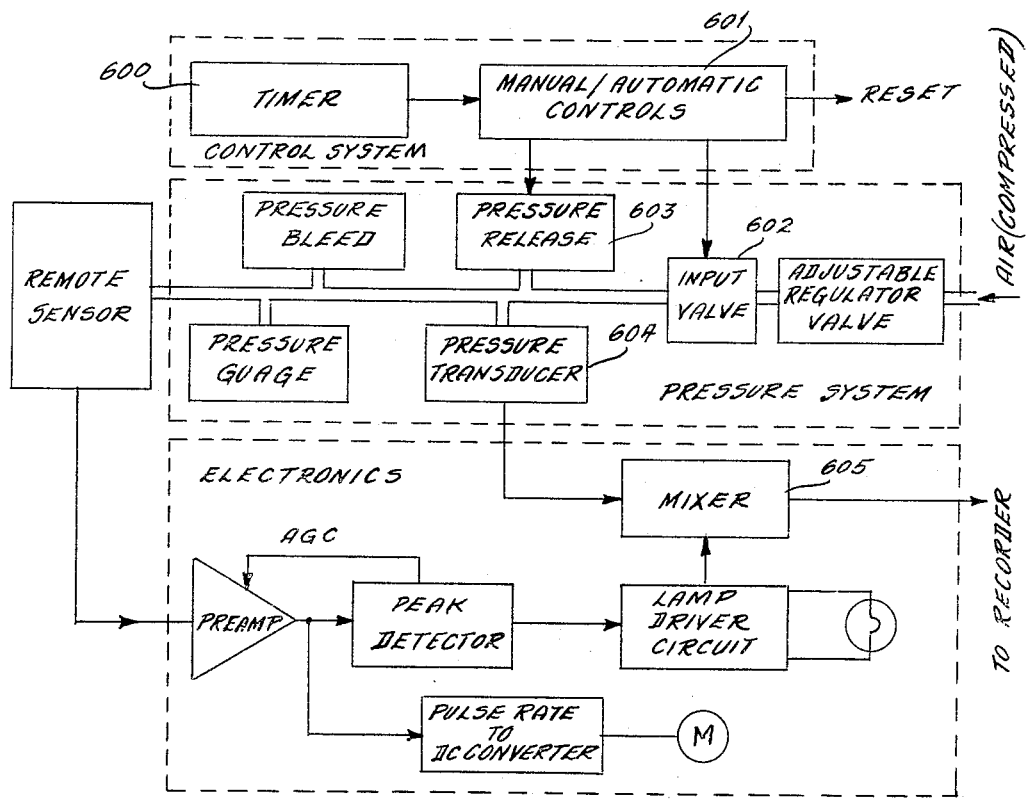
FIG. 9

Patented Jan. 18, 1966

3,229,685
BLOOD PRESSURE MEASURING
Donald L. Ringkamp, St. Louis County, John R. Thompson, Florissant, and Thomas H. Jacobi, St. Louis County, Mo., assignors to Emerson Electric Co., a corporation of Missouri
Filed Apr. 19, 1963, Ser. No. 274,135
10 Claims. (Cl. 128—2.05)

This invention relates to apparatus and method for determining blood pressure.

The conventional blood pressure measuring apparatus now in use is a sphygmomanometer, consisting of an inflatable cuff which is wrapped around a patient's arm, an aneroid manometer for indicating pressure in the cuff, a sufflating bulb with a hand operated relief valve, and a stethoscope. The cuff is inflated until its constriction of the arm cuts off the flow of blood through the artery of the arm. The valve is then opened to permit air to escape slowly from the cuff while the operator listens with the stethoscope for the pulsing rush of blood which signals the overbalancing of the constricting pressure by the pressure of the blood. The pressure of the blood at this point is the so-called systolic pressure. As the pressure in the cuff continues to fall, it first reaches a point at which the sound changes character, and then a point at which no sound is audible. The pressure at the first point is the English and at the second, the American, diastolic pressure. It can be appreciated readily that the diastolic pressure measured by either the English or American standards is rather arbitrary and that in the conventional process there is likely to be enormous variation in the determination of both the systolic and diastolic pressures, since they depend upon the acuteness of the operator and upon ambient conditions. Besides, the conventional method is cumbersome and inconvenient, and may be unpleasant if the pressure of the cuff is applied too long or hard.

An accurate but difficult method of blood pressure measurement consists of inserting a catheter into an artery, and measuring the pressure directly from a manometer.

One of the objects of this invention is to provide apparatus and method for determining blood pressure which are much simpler to use than apparatus and methods known heretofore.

Another object is to provide such method and apparatus which are substantially unaffected by extraneous conditions, and which can be used by a person with little or no previous training.

Still another object is to provide such a method and apparatus which can be used comfortably on a patient, without baring an arm.

Still another object is to provide such method and apparatus which can be used by a patient at a place remote from an observer or recorder.

Other objects will become apparent to those skilled in the art in the light of the following description and accompanying drawings.

In accordance with this invention, generally stated, a blood pressure measuring device is provided into which one need only insert an astringeable member such as a digit (usually a finger) or an ear, and the systolic and diastolic pressures are signalled (and may be recorded) electrically. The signals may be observed or recorded at a place remote from the person whose blood pressure is being measured. This permits observation and recording in a hospital or clinic, for example, at a central control area. The device is light operated, and enclosed when in use so as to be independent to the usual extraneous sounds, light, temperatures, and the like.

Light is projected through an astringent device and a member embraced by the astringent device, and its intensity upon its emergence from the astringent device and member is sensed by a light sensitive resistor. The terms "astringent," "astringeable," and "astrings" are used herein to connote contracting, compressing or constricting, particularly to drive the blood from the constricted tissues (cf. Webster's New International Dictionary, 2nd Ed.). In the preferred embodiment described, the astringent device is an inflatable toroid within which a finger is placed when the toroid is deflated and which is then inflated to astringe the finger to the extent that no pulse is detectable in the astringed area. The astringent pressure is then gradually diminished, its magnitude being indicated or, if desired, recorded, continually.

Electric signals from the light sensitive resistor, corresponding to the variations in the light reaching it, are analyzed in an electronic circuit to detect and signal the first pulses of blood as the astringency of the astringent device is decreased from the point at which no blood flows through the astringed area of the digit, i.e., the systolic pressure, and then to determine and signal the reaching of a pressure at which, under ideal conditions, the standard diastolic pressure would be set by a skilled operator. This latter is based upon the amplitude of the pulse. For the British diastolic pressure, an indication is given at the pulse immediately following the pulse of greatest amplitude. For the American diastolic pressure, an indication is given at a subsequent pulse which has some predetermined fraction of the maximum amplitude.

In the operation of the illustrative device described, the diastolic pressure is determined with the maximum amplitude of pulse as the reference. However, the device of this invention may easily be made to sense the normal constant level of blood and signal the lowest astringent pressure at which partial interruption of the pulse occurs, i.e., the true diastolic pressure. However, as has been pointed out, the American diastolic pressure heretofore has been the pressure at which the operator has been unable to detect the sound of the pulse with a stethoscope, and this has been found empirically to be the pressure existing when the signal generated by the device of this invention indicates the pulse amplitude has diminished to about half the maximum. The device of this invention can be adjusted to signal the reaching of any desired fraction of the maximum, by using suitable voltage dividers.

It will be evident to those skilled in the art that various electronic circuits can be used to detect and signal the initiation of pulses, to compare the amplitude of successive pulses, to detect the maximum amplitude in a series of pulses, and to determine and signal the reaching of an amplitude which is some fraction of the maximum amplitude, once the necessity for these functions is appreciated.

A major feature of this invention is the provision of means by which blood pressure is measured at a member such as a finger within the very area in which the member is astringed. This makes for extreme simplicity of use and accuracy of measurement.

In the drawing, FIGURE 1 is a view in perspective of one illustrative embodiment of blood pressure measuring apparatus of this invention, in use;

FIGURE 2 is a somewhat diagrammatic sectional view showing the position of the finger within the box of the device shown in FIGURE 1;

FIGURE 3 is a diagrammatic representation of the main elements of the illustrative electronic circuits described;

FIGURE 4 is a graph illustrating a typical wave form as reflected in the output of the preamplifier;

FIGURE 7 is a diagrammatic representation of the peak detector and reset part of the illustrative circuit described;

FIGURE 9 is a diagrammatic representation of a combination of manual and automatic system in accordance with another embodiment of this invention; and FIGURE 10 is a typical record produced by the recorder of the automatic system shown in FIGURE 9.

Figure 5:
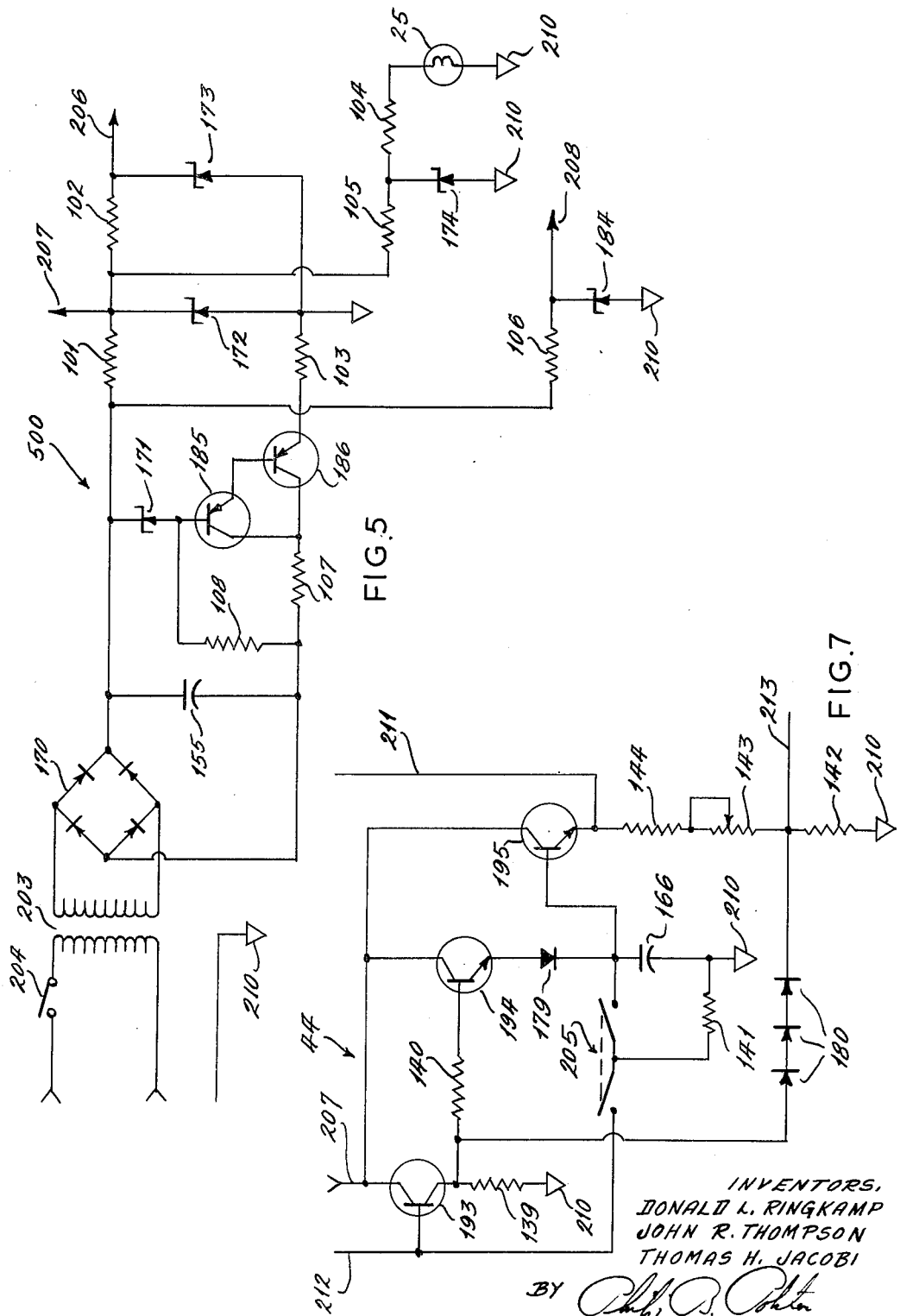
FIGURE 5 is a diagrammatic representation of the power supply of the illustrative embodiment described.

Referring now to the drawing for one illustrative embodiment of this invention, reference numeral 1 indicates a blood pressure measuring device of this invention, which, in the illustrative embodiment shown in FIGURE 1 includes a housing 2 with a hollow boss 3 near one end with a finger receiving hole 4 in it, an indicator light 5, a pressure gauge 6, a sufflating bulb 7, with a manually operable relief valve 8 and a flexible tube 9, and an electric cord 10, for plugging into an ordinary 110 v. A.C. outlet. The flexible tube 9 is bifurcated, inside the housing 2, one branch being connected to and communicating with the pressure gauge 6.

Inside the boss 3, is an inflatable toroid 20, a central aperture 21 of which is aligned with the hole 4 of the boss, to permit the insertion of a finger 22. A stop 23 provides a gauge for the proper insertion, axially of the toroid, of the finger. A lamp 25 in a collimator 26 is connected to a source of electric current to provide light of constant intensity. The collimator directs a beam of the light through a filter 27 which is adapted to transmit light in the region of 6470–7400 A. (red). The toroid is also preferably a clear red rubbery material, such, for example, as toy balloons are made of. Pure rubber is nearly colorless and transparent in thin layers (The Merck Index, 7th Edition, page 910), and the red color is produced by adding dye or a small amount of pigment. See also Handbook of Chemistry and Physics, 38th Edition, page 1476, for suitable rubbery materials with a refractive index of 1.40 to 1.56. Diametrically opposite the collimator 26 with respect to the toroid is a light sensitive resistor 30. The collimator and light sensitive resistor are aligned, and are positioned, axially of the toroid, farther from the end contiguous the hole 4 than from the end remote from the hole 4. The toroid is connected to and communicates with the other branch of the tube 9, hence with the sufflating bulb 7.

The light sensitive resistor 30 is electrically connected to a circuit 40. The circuit 40 of the illustrative embodiment consists broadly (as shown diagrammatically in FIGURE 3) of a preamplifier 41 connected to be controlled by an amplitude gain control 42, and connected to a peak detector 44 connected to a lamp driver circuit 43 which acts to operate the indicator lamps 5. A suitable regulated power supply 500 provides power to all of the components of the circuit.

In the illustrative specific embodiment of a suitable circuit, shown in FIGURES 5–8, the power supply 500 (FIG. 5) is designed to provide constant D.C. voltage. The power supply 500 includes a transformer 203 the primary of which is connected, through an on-off switch 204 to a source of 115 v. 60 cycle alternating current (conventional house current). The secondary of the transformer 203 is connected to a full wave bridge rectifier 170. A capacitor 155 connected across the ouput of the full wave bridge rectifier 170, diminishes the amount of the humping of the wave form from the rectifier. The key component of the power supply is a transistor 186, the collector of which is connected to one side of the capacitor 155 through a dropping resistor 107. The resistor 107 is used merely because the reference supply across capacitor 155 is larger than the rated volage of transistor 186. The purpose of transistor 186 is to change its resistance as a function of current change to the load, thereby maintaining a constant voltage on the load side. Transistor 185, resistor 108, diode 171 and dropping resistor 103 simply aid transistor 186 in accomplishing this purpose.

The collector of transistor 185 is connected to the collector of transistor 186. The base of transistor 185 is connected to both resistor 108 and to reference diode 171. The emitter of transistor 185 is connected to the base of transistor 186. The reference diode 171 is connected to the opposite side of the rectifier 170 from the side to which the collectors of the transistors 185 and 186 are connected.

Resistor 108 provides a bias current such that the diode 171 can set up its reference. In the illustrative embodiment shown, this is a 27 volt reference. The current flowing into the base of transistor 185 is small compared to the bias current in diode 171. That is to say, the bias current into the transistor 185 is negligible compared to the reference current. As the base current of transistor 185 is changed, it in turn changes the collector-emitter current of transistor 185, hence the base current of transistor 186. This controls the load current which flows from the collector of transistor 186 to the emitter of transistor 186. The reference voltage on the bridge rectifier side of resistor 101, then, is governed by diode 171, and, in this illustrative embodiment, is approximately 27 volts. For the particular embodiment, it is desirable to have a reference voltage of 22 volts at the conductor 207, and the resistor 101 and a diode 172, operating in the same way as resistor 108 and diode 171, provide that voltage. Again, a resistor 102 and diode 173 are used to provide a reference voltage of about 10 volts at the conductor 206. So also, resistor 106, and diode 184 are used to provide a reference voltage of 24 volts at conductor 208, and resistor 105 and diode 174 are used to provide a voltage of 20 volts to the power side of a dropping resistor 104, to which the lamp 25 is connected. As has been explained heretofore, lamp 25 provides the light which passes through the toroid and finger.

In summary, the power supply 500 converts ordinary alternating house current to direct current, with taps at 22 volts (207), 10 volts (206), 24 volts (208) and 20 volts to a resistor in series with the lamp 25.

Figure 6:
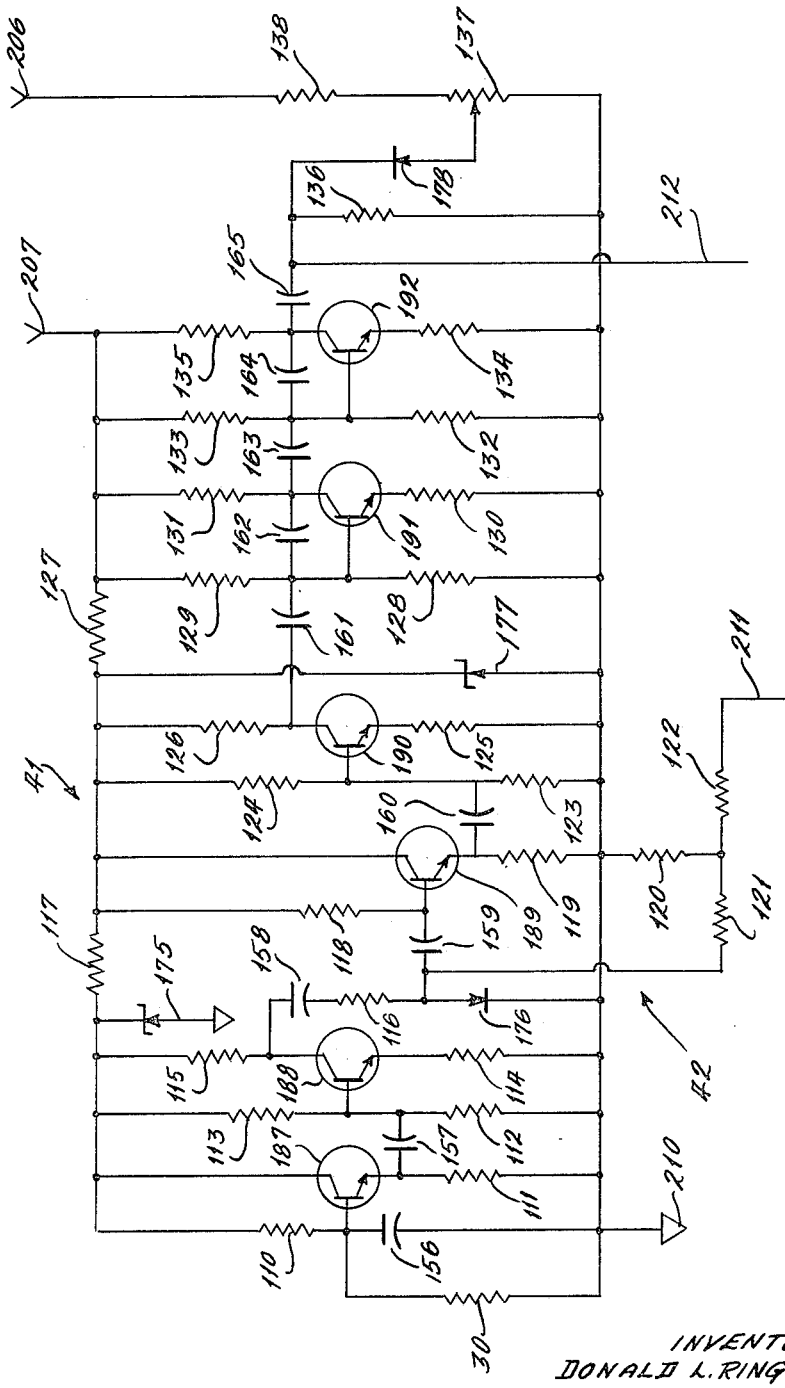
FIGURE 6 is a diagrammatic representation of the preamp and a part of the AGC system of the illustrative embodiment described.
Figure 8:
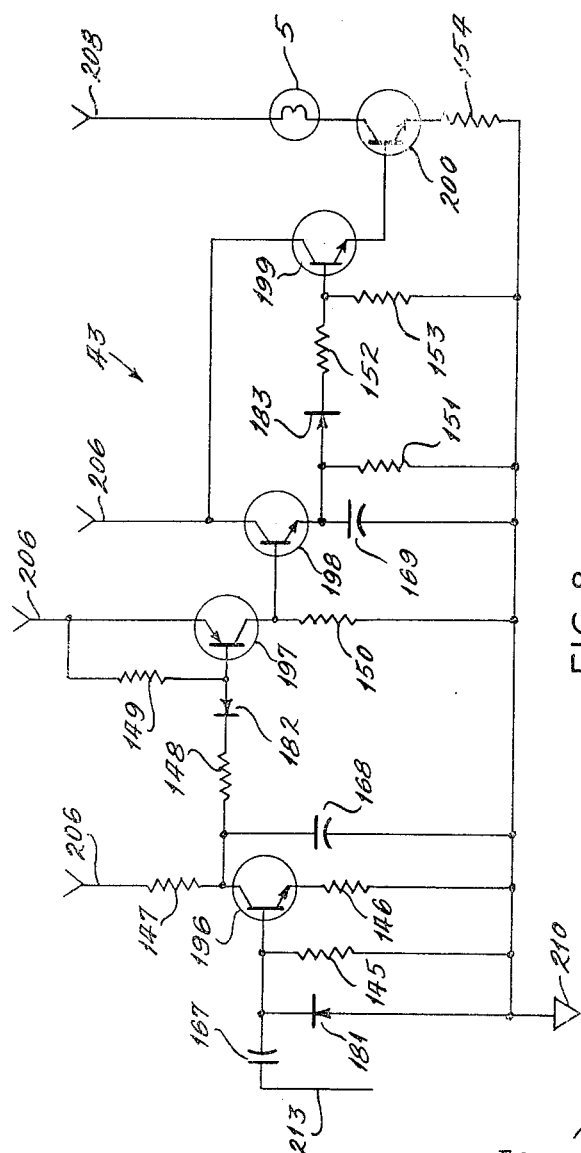
FIGURE 8 is a diagrammatic representation of the lamp driver circuit part of the illustrative circuit described.

It will be recalled that the lamp 25 supplies light, through the toroid and finger, to a light sensitive resistor 30. Referring now to FIGURE 6, light sensitive resistor 30 is connected to ground 210 on one side, and on the other side to the base of a transistor 187. The emitter of transistor 187 is connected to a resistor 111 hence to ground. This configuration of transistor 187 and resistor 111 constitutes a so-called emitter follower, the function of which is to provide an impedance matching. The light sensitive resistor 30 has such a wide variation of resistance (very high at the dark condition and low at a brightly lighted condition) that a high input impedance needs to be provided. A capacitor 156 filters some of the higher frequency noise components from the light sensitive resistor 30, such, for example, as 60 cycle noise. A resistor 110, also connected to the base of transistor 187, provides a bias current to the base of transistor 187, and through the light sensitive resistor 30.

The arrangement of a capacitor 157, connected to the emitter of the transistor 187, a resistor 112 and a resistor 113, both connected to the capacitor 157 and to the base of a transistor 188, is the first of a series of such arrangements which perform a filtering and biasing function. The capacitor 157 allows practically only A.C. signals to pass through it. The capacitor 157 and resistor 112 are adjusted to pass very little low frequency current. The resistor 113 and resistor 112 bias the base of transistor 188. A resistor 114 is connected to the emitter of the transistor 188; a resistor 115, to the collector. The resistor 114 provides an impedance matching characteristic, and the ratio of values of resistors 114 and 115 determines the gain (amplification) of the combination of resistors 114 and 115 and transistor 118. The amplified signal appears at the collector of transistor 188.

A capacitor 158, connected to the collector of transistor 188 is another so-called coupling capacitor, which eliminates the D.C. level which exists at the collector of transistor 188. It provides both coupling of A.C. and filtering, because the combination of the capacitor 158, a resistor 116 connected to the capacitor 158 and a diode 176, connected to the resistor 116 and ground, provide filtering at a particular frequency. The resistor 116, diode 176, and resistors 120, 121, and 122 form part of an automatic gain control system which will be discussed later.

A capacitor 159 is connected to the resistor 116, and, on the other side, to a resistor 118, to perform with resistor 118, a coupling function. The capacitor 159 and resistor 118 are connected to the base of a transistor 189. The emitter of the transistor 189 is connected to a resistor 119, to perform as an emitter follower, an impedance matching device.

A capacitor 160 is connected to the emitter of transistor 189, and to a resistor 119. This is a low impedance point, at which power can be supplied to the remaining portions of the circuit.

The arrangement of capacitor 160 and resistors 123 and 124 is the same, and performs the same function as the arrangement of capacitor 157 and resistors 112 and 113. That is to say, they provide a filtering and biasing function, the resistors being connected to the base of a transistor 190. The configuration of transistor 190, resistor 125 connected to the emitter, and resistor 126, connected to the collector, is an amplifier, the gain being governed for the most part by the ratio of the values of the resistors 125 and 126. Accordingly, at the collector of transistor 190 there is an amplified signal which has associated with it some D.C. level with the A.C. signal riding on it. A capacitor 161, connected to the collector of transistor 190 decouples the D.C. portion, and with resistors 128 and 129, provides another filtering and biasing arrangement. The resistors 128 and 129 are connected to the base of transistor 191, which, with resistors 130 and 131 constitute another amplifier, with the values of the resistors 130 and 131 determining, to some extent, the amount of amplification. A capacitor 162 connected between the collector and the base of the transistor 191 provides a type of capacitive feedback, the purpose of which is two-fold, to adjust the gain of the amplifier and also to provide filtering.

A capacitor 163, connected to the collector of the transistor 191 provides, with resistors 132 and 133, a filtering and bais arrangement for the base of transistor 192. The transistor 192, with resistors 134 and 135 form another amplifier. A feedback capacitor 164 is connected between the base and the collector of the transistor 192. A capacitor 165, connected to the collector of transistor 192, is a decoupling capacitor, decoupling the D.C. level and providing filtering.

At the collector of transistor 192, the signal is an A.C. signal varying about a D.C. level. The capacitor 165 eliminates the D.C. level. Accordingly, on the side of the capacitor 165 toward a resistor 136, there is an A.C. signal. A diode 178 is a so-called clamping diode, which clamps the A.C. signal to a voltage reference determined by the adjustment (in the illustrative embodiment shown, the position of the wiper arm) of a variable resistor 137. Resistors 137 and 138, the latter of which is connected to the conductor 206 of the power supply 500, form a voltage divider.

A resistor 117 and diode 75 produce a reference voltage of 15 volts, the resistor 117 providing a bias current to the diode. Similarly, resistor 127 and diode 177 provide a reference voltage of 18 volts.

A conductor 112 connected at one end between the capacitor 165 and resistor 136, is connected to the base of a transistor 193 which forms a part of the peak detector circuit. The conductor 112 transmits the clamped signal to the transistor 193. The transistor 193 and a resistor 139, connected to the emitter of the transistor 193, form an emitter follower. A resistor 140, also connected to the emitter of the transistor 193, and to the base of a transistor 194, is simply a dropping resistor to prevent damage to transistor 194. Diodes 180 are connected between the resistor 139, and the resistor 140. The diodes 180 are connected to a conductor 213.

The conductor 212 is connected also to one pole of a switch 205. The switch 205, normally biased to open position as shown in FIG. 7, is connected to a resistor 141, and has a pole connected to a diode 179, the base of a transistor 195 and a capacitor 166. The collectors of transistors 193, 194 and 195 are all connected to the conductor 207, from the power supply 500. The emitter of the transistor 194 is connected to the diode 179. The emitter of the transistor 195 is connected to a conductor 211 from the automatic gain control part of the amplifier circuit, which will be described hereafter, and to a voltage divider arrangement which includes a resistor 144, a variable resistor 143 and a resistor 142, the resistor 144 is connected in series with the variable resistor 143, which is connected to the conductor 213. The resistor 142 is connected to the conductor 213 and to ground 210. The conductor 213 is connected to a capacitor 167 of the lamp driver circuit 43. The capacitor 167 is connected in turn to the base of a transistor 196. A diode 181 and a resistor 145 are connected in parallel with one another, on one side to the base of the transistor 196, and on the other side to ground. The diode 181 is a clamping diode, and the capacitor 167 and the resistor 145, with the diode 181, serve to filter and to provide an A.C. coupling. The transistor 196, with a resistor 147 connected to its collector and to the conductor 206, and a resistor 146 connected to its emitter, thence to ground, serves as an amplifier. The signal at the base of transistor 196 is sharply peaked, (differentiated). A capacitor 168 connected to the collector of the transistor 196, thence to ground, serves to broaden the base of the signal. A resistor 148, connected to the collector of the transistor 196, increases the load on the amplifier combination of transistor 196 and resistors 146 and 147. A diode 182, connected to the resistor 148 and to the base of a transistor 197, permits only negative signals to be applied to the base of transistor 197. The transistor 197 is a PNP type whereas the remaining transistors in the system are of the NPN type. A resistor 149 connected to the base of the transistor 197, between the base and the diode 182, is also connected to the emitter of the transistor 197, and provides bias to the transistor 197. The resistor 149 and the emitter of the transistor 197 are both connected to the conductor 206.

The collector of the transistor 197 is connected directly to the base of a transistor 198. It is also connected to a resistor 150, which is connected to ground, and the transistor 197 and resistor 150 form an amplifier. A capacitor 169 and a resistor 151 connected in parallel to the emitter of the transistor 198, serves to stretch out the signal, at the transistor 198. The collector of the transistor 198 is connected to the conductor 206, and directly to the collector of a transistor 199. A diode 183, connected to the emitter of the transistor 198 between the resistor 151 and a resistor 152 rejects all negative signals, transmitting only positive signals to the base of the transistors 199. The resistor 152 is connected to the diode 183 and the base of the transistor 199. Between the resistor 152 and the base of the transistor 199, a resistor 153 is connected to the base, and to ground. The resistors 152 and 153 provide a bias for the transistor 199, and also a voltage divider to obtain the proper current level to supply the base of transistor 199. The transistor 199 is used as a current gain device. A very small current provided to the base of transistor 199 may provide a factor of the order of 40 times that current at the emitter of transistor 199. The emitter of transistor 199 is connected directly to the base of a transistor 200. The transistor 200 is also another current gain device, providing sufficient current to operate the indicator lamp 5. The indicator lamp 5 is connected to the collector of the transistor 200, and to the conductor 208. The emitter of the transistor 200 is connected to a grounded resistor 154, which is a bias resistor or voltage dropping resistor, insuring that the voltage rating in transistor 200 is not exceeded.

All of the circuit has now been described except the automatic gain control. Because there is a wide variation in the amplitude of the signal produced at light sensitive resistor 30, resulting from variations in the transmissability of fingers of different people, it is not practical to arrange the circuit with a fixed amount of gain to accommodate all fingers. Therefore, it is desirable to adjust the gain as a function of the voltage of the peak detector. If the voltage of the peak detector is high, as determined at the capacitor 166, the gain of the amplifier is decreased at the diode 176 of the amplifier circuit.

The voltage on conductor 211 is essentially the voltage on capacitor 166. This voltage is fed back to a voltage divider network consisting of resistors 120 and 122. The function of the voltage divider network is to provide the proper current to diode 176. The resistance of the diode changes as a function of the current in the device. A resistor 121 between the divider network and the diode 176, is simply a dropping resistor, to provide the proper current to the diode 176. The resistance of the diode 176 decreases as a function of increased current, which is provided by greater voltage on the peak detector.

In the combination of capacitor 158, resistor 116, and diode 176, the capacitor serves to filter the signal. It can be seen that if the resistance of the diode 176 decreases, the voltage divider action of the resistor 116 and the diode 176 produces a lower voltage at the junction of the resistor 116 and diode 176. Thus, the voltage on conductor 211 determines the current through the resistor 121 and also through the diode 176 which in turn determines the voltage divider action of the resistor 116 and diode 176. This in turn determines the amplitude of the signal applied to the following amplifier. In addition, the transistor circuits have matching impedances. When the impedance is lowered, the effective impedance seen by the transistor 188 is lowered, lowering the gain, so that the gain control includes a combination of loading, on the circuit of transistor 188, and the voltage divider action of the diode 176 and resistor 116.

Merely by way of illustration, and not by way of limitation, components of the following values or character may be used in the illustrative circuit described and illustrated:

| Reference numeral: | Value or description, ohms |
|---|---|
| 101 | 120 |
| 102 | 1,000 |
| 103 | 2.7 |
| 104 | 130 |
| 105 | 1,000 |
| 106 | 75 |
| 107 | 33 |
| 108 | 430 |
| 110 | 100,000 |
| 111 | 10,000 |
| 112 | 100,000 |
| 113 | 1,000,000 |
| 114 | 5,100 |
| 115 | 30,000 |
| 116 | 100,000 |
| 117 | 3,000 |
| 118 | 5,100,000 |
| 119 | 4,700 |
| 120 | 68,000 |
| 121 | 2,700,000 |
| 122 | 220,000 |
| 123 | 10,000 |
| 124 | 430,000 |
| 125 | 200 |
| 126 | 10,000 |
| 127 | 820 |
| 128 | 10,000 |
| 129 | 560,000 |
| 130 | 100 |
| 131 | 10,000 |
| 132 | 10,000 |
| 133 | 470,000 |
| 134 | 100 |
| 135 | 10,000 |
| 136 | 200,000 |
| 137 | 5,000 |
| 138 | 18,000 |
| 139 | 3,900 |
| 140 | 10,000 |
| 141 | 10 |
| 142 | 56,000 |
| 143 | 100,000 |
| 144 | 39,000 |
| 145 | 22,000 |
| 146 | 1,000 |
| 147 | 10,000 |
| 148 | 4,300 |
| 149 | 4,300 |
| 150 | 10,000 |
| 151 | 10,000 |
| 152 | 3,900 |
| 153 | 3,900 |
| 154 | 15 |

| | Microfarads |
|---|---|
| 155 | 250 |
| 156 | 0.1 |
| 157 | 1.0 |
| 158 | 5.0 |
| 159 | 5.0 |
| 160 | 5.0 |
| 161 | 5.0 |
| 162 | 1.5 |
| 163 | 5.0 |
| 164 | 1.0 |
| 165 | 15.0 |
| 166 | 45.0 |
| 167 | 5.0 |
| 168 | 10.0 |
| 169 | 120.0 |

Reference numeral: Value or description
170____ Four rectifier diodes typically 1N648.
171____ Twenty-seven volt reference diode typically 1N1361.
172____ Twenty-two volt reference diode typically 1N1359.
173____ Ten volt reference diode typically 1N764.
174____ Twenty volt reference diode typically 1N1778.
175____ Fifteen volt reference diode typically 1N718.
176____ Silicon diode typically 1N463.
177____ Eighteen volt reference diode typically 1N720.
178____ Silicon diode typically 1N463.
179____ Silicon diode typically 1N461.
180____ Three silicon diodes typically 1N461.
181____ Silicon diode typically 1N461.
182____ Silicon diode typically 1N461.
183____ Silicon diode typically 1N461.
184____ Twenty-four volt reference diode typically 1N1780.
185____ Germanium transistor typically 2N1374.
186____ Germanium transistor typically 2N307.
187____ Germanium transistor typically 2N1304.
188____ Germanium transistor typically 2N1304.

| | |
|---|---|
| 189 | Germanium transistor typically 2N1304. |
| 190 | Germanium transistor typically 2N1304. |
| 191 | Germanium transistor typically 2N1304. |
| 192 | Germanium transistor typically 2N1304. |
| 193 | Germanium transistor typically 2N1304. |
| 194 | Silicon transistor typically 2N119. |
| 195 | Silicon transistor typically 2N119. |
| 196 | Germanium transistor typically 2N1304. |
| 197 | Germanium transistor typically 2N1304. |
| 198 | Germanium transistor typically 2N1304. |
| 199 | Germanium transistor typically 2N1304. |
| 200 | Germanium transistor typically 2N1304. |
| 25 | General purpose lamp typical rating 28 volts 40 milliamperes. |
| 5 | General purpose lamp typical rating 28 volts 40 milliamperes. |
| 203 | Transformer typical rating input 115 volts output 28 volts. |

The operation of the power supply and the amplifier circuits will be immediately apparent. In the peak detector circuit, the clamped signal from the amplifier is applied to the base of the transistor 193, and from the emitter of transistor 193 to the base of transistor 194. The combination of transistor 194, diode 179 and capacitor 166 is similar to an emitter-follower, except that instead of having a resistor in the emitter of transistor 194 there is the diode 179 and the capacitor 166. The capacitor 166 is a storage capacitor. It stores the peak value of any signal that is applied to the base of transistor 194. The diode 179 acts as a valve to maintain the voltage in the charge on the capacitor 166. It has a low impedance value for a charge going into the capacitor but a high impedance for a charge attempting to go from the capacitor back through the emitter-base junction. Transistor 195, and resistors 144, 143 and 142 constitute an emitter follower, which provides a high input impedance for capacitor 166. The emitter-follower does not take much charge but the voltage of the capacitor is reflected at the conductor 211. Thus, the voltage on the conductor 211 is the peak voltage of any signal coming from the conductor 212, i.e. the peak charge on the capacitor 166. The divider network, made up of resistors 142, 143 and 144, is used to produce, at their junction with conductor 213, a certain fraction of the voltage on the conductor 211. By way of illustration, it will be assumed that the voltage of this juncture is one half of the voltage on the conductor 211. The diodes 180 acts as valves, to permit signals from the emitter of the transistor 193 to be transmitted in the direction toward the resistor 142, but substantially to block signals in the opposite direction. That is to say they have a low impedance in the direction toward the resistor 142, but a high impedance in the opposite direction. Thus, a signal coming from the emitter of the transistor 193, the peak voltage of which is higher than one half the voltage on the conductor 211, will produce a signal, through the diodes 180, on the conductor 213. If the peak voltage of a signal from the emitter of the transistor 193 is less than one half the voltage on the conductor 211, then due to the impedance characteristics of the diodes 180, no signal will appear from the emitter, at the conductor 213.

In terms of the operation of the device, when no blood is flowing through the astringed member, no signal is generated, because the resistance of the light sensitive resistor 30 remains constant. As soon as blood begins to pulse through the finger, the resistance in the light sensitive resistor 30 changes (and hereafter begins to vary periodically), a signal is generated, and, since the capacitor 166 is charged no higher than the peak voltage of the signal, a signal is transmitted through the diodes 180, to the conductor 213, to the indicator light driving circuit, and the lamp 5 begins to blink. This continues as the pressure on the finger is released and the peak amplitude of the pulsing is passed and the amplitude of the signal, i.e. of the variation in the resistance of the light sensitive resistor 109, has reached one half of the peak value, in the illustrative embodiment described. At that point, the voltage at the junction of resistors 142 and 143 and the conductor 213 is the same as the voltage through the diodes 180, no signal will pass through the indicator lamp driver circuit, and the indicator lamp 5 will stop blinking.

If the amplitude of the signal on the first pulse is high, the automatic gain control will act to lower the gain on the following pulse by a certain amount. If on the other hand, the amplitude is small enough, there will be no decrease in the gain on the subsequent pulse. The control of the gain is readjusted on each pulse up to the peak amplitude pulse.

From the point of view of the operator and of the person whose blood pressure is being determined, the operation of this illustrative embodiment of the device of this invention is as follows.

The toroid 20 is deflated, and a finger is inserted through the hole 4, into the central opening 21 of the toroid, until the end of the finger meets the stop 23, so as to ensure that the finger fills the toroid. The valve 8 is closed and the sufflating bulb 7 is then manipulated to pump air into the toroid 20. The toroid is thus inflated until the pressure, as indicated by the gauge 6, is greater than any expected systolic pressure. This astringes the area of the finger within the toroid to the point at which no pulse is present, i.e., no blood flows through the arteries. In the manually operated device shown, the switch 205 is closed momentarily to discharge the capacitor 166. The valve 8 is then cracked, and the pressure permitted to drop slowly. As the astringent pressure reaches the systolic pressure point, the blood starts to flow intermittently, at the peak of the pulse, and the light sensitive resistor begins to send pulse signals to the rest of the electric system (as has been described), where the signals are converted to a light signal, i.e., the lamp 5 begins to blink. The pressure indicated by the gauge at the point at which the lamp first glows is the systolic pressure. As the pressure in the toroid is released, the blinking of the lamp 5 continues until the diastolic pressure is reached, when the lamp goes out. The lighting and extinguishing of the lamp 5 are easy to observe and to relate to the pressure gauge, but it can be seen that the electric impulses which light and extinguish the lamp can be used as well to record the pressures automatically.

A diagrammatic representation of a combination manual and automatic system is shown in FIG. 9. In it, a timer 600 acts, when operation of the device is initiated, probably by the person whose blood pressure is being taken, to control the application of pressure and its diminution, over a predetermined period of time. As is indicated on the diagram, the timer governs certain automatic controls 601 which operates an input valve 602 to inflate the toroid, and, subsequently a pressure release mechanism 603 to permit the pressure in the toroid to be released slowly over a predetermined period. The pressure, in the automatic system, is reflected in a pressure transducer, 604, signals from which are fed to a mixer 605, thence to a recorder 606. The pulse signal circuit may be substantially the same as the one described in the illustrative embodiment, except that in addition to the indicator lamp 5, the lamp driver circuit is connected to the mixer 605, and the resultant signals are sent to the recorder. A typical output to the recorder is shown diagrammatically in FIG. 10.

Numerous variations in the construction of the various components of the device of this invention, within the scope of the appended claims, will occur to those skilled in the art. For example, while the sufflating bulb or other toroid-inflating device is commonly filled with air, and the toroid inflated with the same air, other gases may be used, either in the manual or automatic device. Other fluids, such as water and other liquids, or combinations of liquids and gases may be used. The astringent device may even take the form of a mechanical, rather than hydraulic device such as a tube the diameter of which decreases as the tube is elongated. If a member such as an ear lobe is to be astringed, it is even possible that a simple press type clamp can be used, just so that the light from a steady source passes through the astringing device and the area astringed, to a light sensitive resistor. The circuit by which the signals from the light sensitive resistor are translated into intelligible form can be varied in any number of ways within the skill of the technician in the electronics art.

Other attachments, and combinations of signalling and recording means may be provided. For example, an audible signal may be produced as well as, or in lieu of, the visual blinking signal. Since the onset of the pulse and the reaching of the diastolic pressure are marked by electrical signals, they may obviously be recorded in any desired form, and in combination with similarly electrically indicated information.

These areas of variation are merely illustrative.

Having thus described the invention, what is claimed and desired to be secured by Letters Patent is:

1. A blood pressure measuring device comprising a light source, a light sensitive resistor positioned to receive light from said source, light permeable astringent means located between said light source and said light sensitive resistor and adapted to receive and encompass a human member and to position a member so received between said light source and said light sensitive resistor, means for selectively varying the astringency of said astringent means, and means, electrically connected to said light sensitive resistor, for converting to intelligible form change in intensity of light reaching said light sensitive resistor from said source, through said astringent means and member, with variations in astringency of said astringent means.

2. A method of measuring blood pressure comprising projecting light through an astringent device and a human member astringed thereby, varying the degree of astringency to which said member is subjected, and measuring electrically the amount of light transmitted through said astringent device and member at varying degrees of astringency.

3. A method of measuring blood pressure comprising projecting light through an astringent device and a human digit astringed thereby, varying the degree of astringency to which said digit is subjected from that at which the pulsing of blood through said digit is cut off to that at which the blood flows substantially continuously, and measuring electrically the amplitude of the change of light transmitted during the pulsing of the blood at various degrees of astringency.

4. A method of measuring blood pressure comprising astringing a member through which blood normally flows, by means of an astringent device, to cut off the flow of blood through said member, projecting light through the member from which the flow of blood has been cut off by the astringent device the astringency of which can be controlledly varied, decreasing the astringency of said device to permit the gradual resumption of blood flow through said member, projecting light into said member continuously while said member is astringed, measuring electrically the variations in light from said member resulting from the coursing of blood in said member as the astringing of said device is decreased, comparing electrically the variation of greatest amplitude with the amplitude of succeeding lesser variations until the amplitude of one of said succeeding variations bears a preset fractional relation to the amplitude of said variation of greatest amplitude, and converting to intelligible form the information, electrically determined, that the said relation has been established.

5. In a blood pressure measuring device in which the magnitude of pulsation of the blood through a member is measured electrically, the improvement comprising means for translating the pulse of blood into an electric signal the voltage of which is a known function of the amplitude of the blood pulse; a peak detector circuit, electrically connected to said translating means, including voltage dividing means and a peak value storage device connected to said voltage dividing means and to said translating means, and an indicator circuit electrically connected to said translating means and opposedly connected to said voltage dividing means, whereby a signal from said translating means of a voltage higher than the divided voltage from said peak value storage device is transmitted to said indicator circuit and a signal from said translating means of a voltage lower than the divided voltage from said peak value storage device is blocked from said indicator circuit.

6. The device of claim 5 wherein an automatic gain control circuit is provided, connected to said translating circuit, to lower the gain in voltage of a subsequent signal from said translating circuit in response to an amplitude of previous signal greater than a predetermined limit.

7. A blood pressure measuring device comprising a light source, a light sensitive resistor positioned to receive light from said source, light permeable astringent means located between said light source and said light sensitive resistor and adapted to receive and encompass a human member, means for varying the astringency of said astringent means, recording means connnected to said astringing varying means for recording the amount of astringency, and means, electrically connected to said light sensitive resistor and to said recording means, for recording, concurrently with the recording of the amount of astringency, the commencement of pulsed variation of intensity of light reaching said light sensitive resistor and the attainment of a maximum variation in amplitude or a predetermined fraction thereof.

8. The device of claim 7 which includes means operatively connected to said astringent means for causing said astringent means to apply a predetermined astringency sufficient to insure no detectable flow of blood through the astringed member, and means for reducing said astringency steadily over a preset period of time.

9. The device of claim 1 wherein the means for converting to intelligible form includes a lamp which is energized when changes in intensity of light reaching the light sensitive resistor commence after a steady state, and de-energized at a predetermined point after the maximum change in light intensity has been reached, as the astringency is reduced from a value at which blood does not flow detectably in the astringed member.

10. A blood pressure measuring device comprising a light source; astringent means adapted to receive a human member and located to permit a part of said member to intercept light from said light source; means for varying the astringency of said astringent means from a condition at which no blood flows through said member to a condition at which the flow of blood is substantially unimpeded; means, in the form of a light sensitive resistor positioned to receive light through said member from said source, for translating the pulse of blood into an electric signal the voltage of which is a known function of the amplitude of the blood pulses; a peak detector circuit, electrically connected to said translating means, including voltage dividing means and a peak value storage device connected to said voltage dividing means and to said translating means, and an indicator circuit electrically connected to said translating means and opposedly connected to said voltage dividing means, whereby a signal from said translating means of a voltage higher than the divided voltage from said peak value storage device is transmitted to said indicator circuit and a signal from said translating means of a voltage lower than the divided voltage from said peak value storage device is blocked from said indicator circuit.

(References on following page)

References Cited by the Examiner

UNITED STATES PATENTS

| | | | |
|---|---|---|---|
| 2,493,301 | 1/1950 | Loria | 128—2.05 |
| 2,540,163 | 2/1951 | Brosene | 128—2.05 |
| 2,865,365 | 12/1958 | Newland | 128—2.05 |
| 2,944,542 | 7/1960 | Barnett | 128—2.05 |
| 3,087,488 | 4/1963 | Streimer | 128—2.05 |
| 3,090,377 | 5/1963 | Salisbury | 128—2.05 |
| 3,103,214 | 9/1963 | Smith | 128—2.05 |

RICHARD A. GAUDET, *Primary Examiner.*

LOUIS R. PRINCE, *Examiner.*

SIMON BRODER, *Assistant Examiner.*